US009817239B2

(12) United States Patent
Chen

(10) Patent No.: US 9,817,239 B2
(45) Date of Patent: Nov. 14, 2017

(54) THREE-DIMENSIONAL DISPLAY DEVICE HAVING LENS-SWITCHING FUNCTION

(71) Applicant: Shenzhen China Star Optoelectronics Technology Co., Ltd., Shenzhen, Guangdong (CN)

(72) Inventor: Jianhong Chen, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 382 days.

(21) Appl. No.: 14/433,670

(22) PCT Filed: Jan. 6, 2015

(86) PCT No.: PCT/CN2015/070190
§ 371 (c)(1),
(2) Date: Apr. 5, 2015

(87) PCT Pub. No.: WO2016/106792
PCT Pub. Date: Jul. 7, 2016

(65) Prior Publication Data
US 2016/0341971 A1 Nov. 24, 2016

(30) Foreign Application Priority Data
Dec. 30, 2014 (CN) .......................... 2014 1 0850917

(51) Int. Cl.
G02B 27/22 (2006.01)
G02F 1/1335 (2006.01)
H04N 13/04 (2006.01)

(52) U.S. Cl.
CPC ......... *G02B 27/2214* (2013.01); *G02B 27/22* (2013.01); *G02F 1/1335* (2013.01); *G02F 1/133526* (2013.01); *H04N 13/0404* (2013.01); *H04N 13/045* (2013.01); *H04N 13/0413* (2013.01); *H04N 13/0447* (2013.01); *H04N 13/0497* (2013.01); *H04N 2213/001* (2013.01)

(58) Field of Classification Search
None
See application file for complete search history.

(56) References Cited

U.S. PATENT DOCUMENTS

2011/0149391 A1* 6/2011 Brott ................ B29D 11/00278
359/463
2012/0194510 A1* 8/2012 Yun .......................... G02B 3/06
345/419
2013/0341694 A1* 12/2013 Maekawa ......... H01L 31/02164
257/294

FOREIGN PATENT DOCUMENTS

CN 1838779 3/2006

* cited by examiner

Primary Examiner — Eileen Adams
(74) Attorney, Agent, or Firm — Andrew C. Cheng

(57) ABSTRACT

A 3D display device having a lens-switching function. The device includes an LCD picture layer, a lens-array plate, an LCD shielding pattern layer, and a synchronous picture providing system. The synchronous picture providing system is connected with the LCD picture layer and the LCD shielding pattern layer such that the LCD picture layer and the LCD shielding pattern layer are synchronous to respectively display a 3D picture and a shielded pattern. Through increasing an area of black shielding pattern, an edge of each lens unit corresponding to the shielding region is shielded, the area of a single light transparent region is reduced, and a light transparent aperture of a lens unit corresponding to the shielding region is reduced in order to eliminate a cross talk generated by scattering and bluntness at the edge.

10 Claims, 5 Drawing Sheets

THREE-DIMENSIONAL DISPLAY DEVICE HAVING LENS-SWITCHING FUNCTION

BACKGROUND OF THE INVENTION

1. Field of the Invention

The present invention relates to a three-dimensional (3D) display technology field, and more particularly to a 3D display device having a lens-switching function.

2. Description of Related Art

In the conventional three-dimensional (3D) display technology, switching of a lens is required. In switching the lens, an area of a black shielding pattern is equal to an area of the lens. The drawbacks of the above design is: (1) because the manufacturing problem, scattering is existed at an edge of the lens; or because the edge of the lens is not sharp enough, the eyes can see unnecessary lights so as to cause a cross talk phenomenon. (2) In the conventional art, a spherical lens or a cylindrical lens is usually used; an aberration is existed such that a sampling point at a large viewing angle is greater than a sampling point at a small viewing angle. With reference to FIG. 1 and FIG. 2, FIG. 1 is an optical path propagation diagram of the scattering generated at the edge of the lens of a 3D display in the conventional art and FIG. 2 is an optical path propagation diagram of sampling points at different viewing angles of a 3D display. As shown in FIG. 1, because the edge of the lens is not sharp enough, the eyes can see the unnecessary lights such that the lights are not focused on so as to be fuzzy. The "a" in FIG. 1 represents a location of a sampling point of a display device 100. In FIG. 2, because a sampling point at a large viewing angle is greater than a sampling point at a small viewing angle, when sampling at a same horizontal level, the aberration is generated. That is, at the viewing large angle, the eyes can see the unnecessary lights (a crosstalk), which will affect a 3D display effect, even no 3D display effect. In FIG. 2, the points "a" and "b" represent different sampling points on the display device 100.

SUMMARY OF THE INVENTION

The present invention provides a 3D display device having a lens-switching function in order to solve a cross talk generated by scattering and bluntness at the edge and an aberration generated by different sizes of sampling points at different viewing angles.

In order to solve the above problems, the present invention provides a 3D display device having a lens-switching function, the devices comprising: a liquid-crystal-display (LCD) picture layer; a lens-array plate; an LCD shielding pattern layer, wherein the LCD shielding pattern layer, the lens-array plate, and the LCD display picture layer are stacked in order; and a synchronous picture providing system connected with the LCD picture layer and the LCD shielding pattern layer such that the LCD display picture layer and the LCD shielding pattern layer are synchronous to respectively display a 3D picture and a shielded pattern.

According to a preferred embodiment of the present invention, an LCD shielding pattern layer including a shielding region and a light transparent region disposed with an interval and the lens-array plate having multiple lens units, wherein, an area of a single light transparent region is smaller than an area of a single lens unit such that an edge of each lens unit corresponding to the shielding region is shielded, the area of a single light transparent region is reduced, and a light transparent aperture of a lens unit corresponding to the shielding region is reduced in order to eliminate a cross talk generated by scattering and bluntness at the edge.

According to a preferred embodiment of the present invention, the LCD shielding pattern layer is disposed between the lens-array plate and the LCD picture layer.

According to a preferred embodiment of the present invention, the lens-array plate is formed by multiple liquid-crystal lens units or multiple solid-state lens units.

According to a preferred embodiment of the present invention, each lens unit is a cylindrical lens or a compound eye lens, and the lens units are closely contacted.

According to a preferred embodiment of the present invention, a shape of each lens unit is a circle, a square, a rectangle or a polygon.

According to a preferred embodiment of the present invention, when the synchronous picture providing system transmits a first frame of a 3D picture to the LCD picture layer, the LCD shielding pattern layer shields an odd number lens unit; when the synchronous picture providing system transmits a second frame of a 3D picture to the LCD picture layer, the LCD shielding pattern layer shields an even number lens unit so as to alternatively display the 3D pictures corresponding to the odd number and the even number lens units.

According to a preferred embodiment of the present invention, when the synchronous picture providing system transmits a first frame of a 3D picture to the LCD picture layer, the LCD shielding pattern layer shields an odd row and odd column lens unit; when the synchronous picture providing system transmits a second frame of a 3D picture to the LCD picture layer, the LCD shielding pattern layer shields an odd row and even column lens unit; when the synchronous picture providing system transmits a third frame of a 3D picture to the LCD picture layer, the LCD shielding pattern layer shields an even row and even column lens unit; when the synchronous picture providing system transmits a fourth frame of a 3D picture to the LCD picture layer, the LCD shielding pattern layer shields an even row and odd column lens unit so as to alternatively display the 3D pictures.

According to a preferred embodiment of the present invention, a refresh rate of each of the LCD picture layer and the LCD shielding pattern layer is at least 120 Hz.

According to a preferred embodiment of the present invention, a refresh rate of each of the LCD picture layer and the LCD shielding pattern layer is at least 240 Hz.

Comparing to the conventional art, the 3D display device having a lens-switching function of the present invention. Through increasing an area of black shielding pattern, an edge of each lens unit corresponding to the shielding region is shielded, the area of a single light transparent region is reduced, and a light transparent aperture of a lens unit corresponding to the shielding region is reduced in order to eliminate a cross talk generated by scattering and bluntness at the edge.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following will combine drawings and embodiments for detailed description of the present invention.

Figure 1:
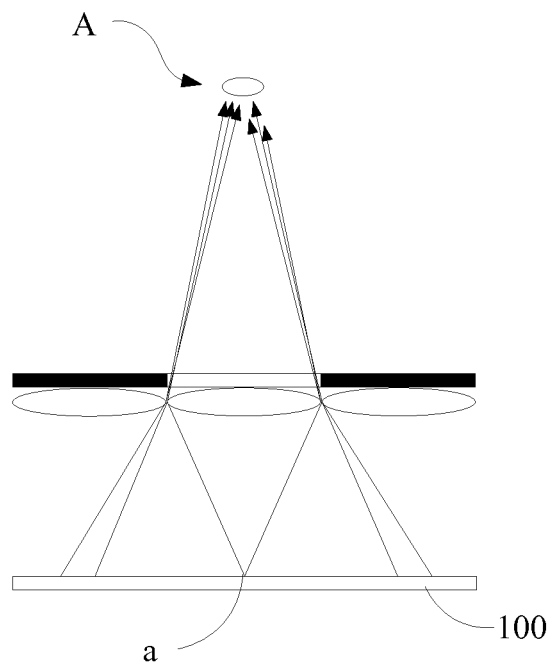
FIG. 1 is an optical path propagation diagram of the scattering generated at an edge of a lens of a 3D display in the conventional art.
Figure 2:
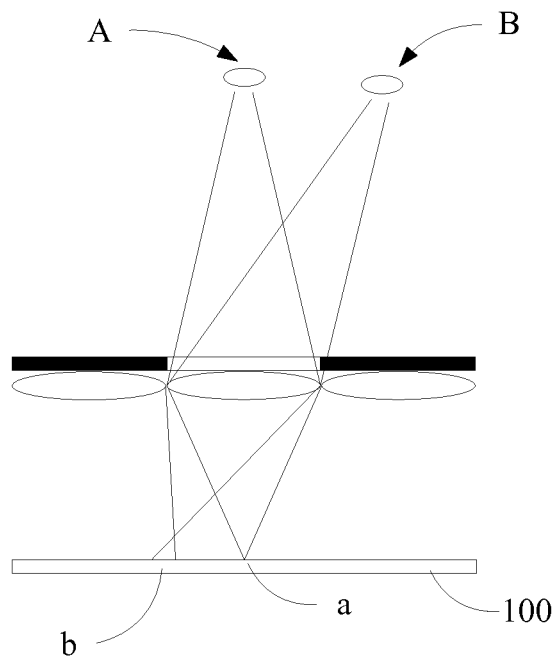
FIG. 2 is an optical path propagation diagram of sampling points at different viewing angles of a 3D display.
Figure 3:
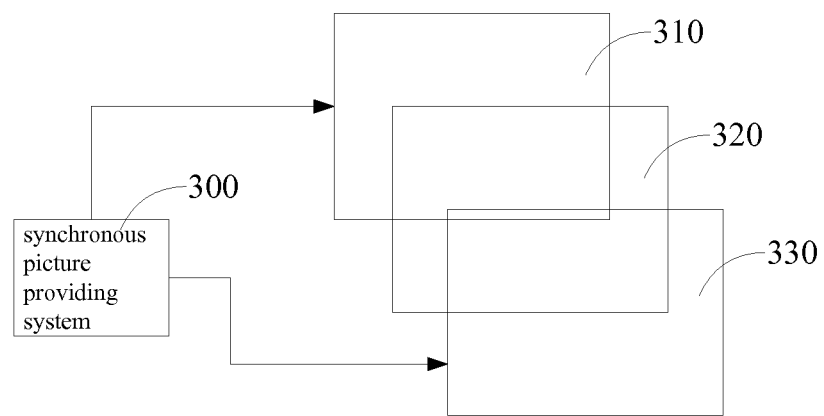
FIG. 3 is a schematic diagram of a 3D display device having a lens-switching function according to the present invention.

With reference to FIG. 3, FIG. 3 is a schematic diagram of a 3D display device having a lens-switching function according to the present invention. The 3D display device having a lens-switching function includes a synchronous picture providing system 300, a liquid-crystal-display (LCD) picture layer (LCD1) 310, a lens-array plate 320, and an LCD shielding pattern layer (LCD2) 330. Wherein, the synchronous picture providing system 300 is respectively connected with the LCD picture layer 310 and the LCD shielding pattern layer 330 such that the LCD picture layer 310 and the LCD shielding pattern layer 330 respectively and synchronously display a 3D picture and a shielded pattern.

Figure 4:
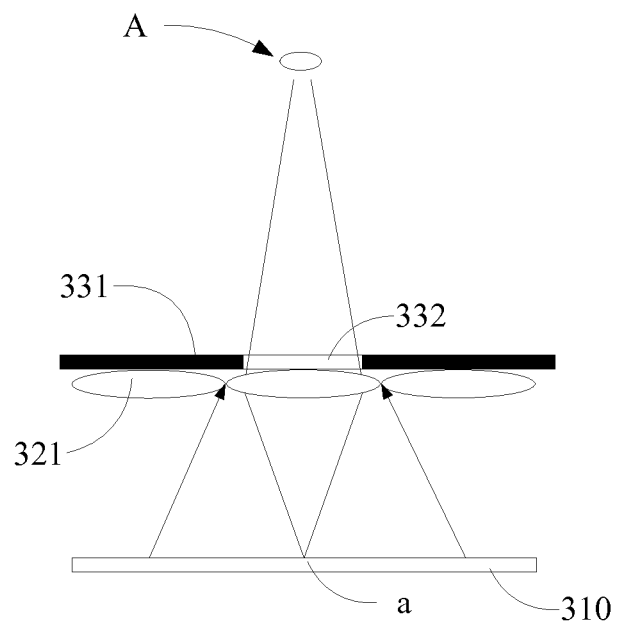
FIG. 4 is a schematic diagram of an optical path propagation of a 3D display device having a lens-switching function according to the present invention.
Figure 5:
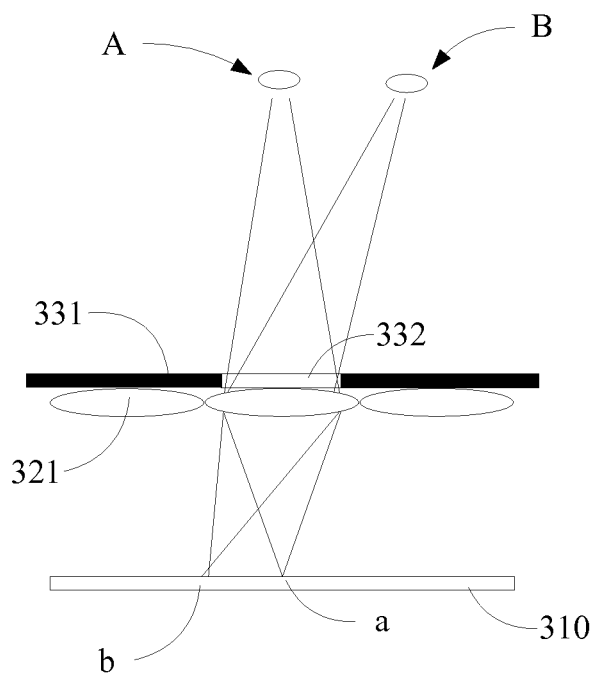
FIG. 5 is another schematic diagram of an optical path propagation of a 3D display device having a lens-switching function according to the present invention.
Figure 6:
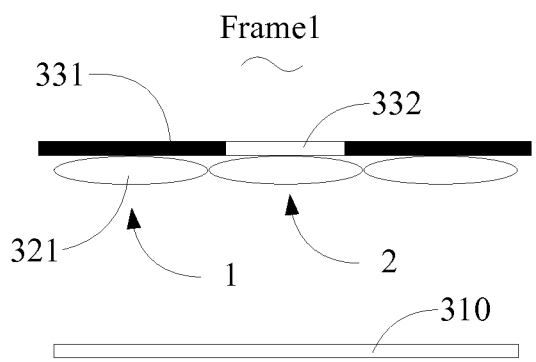
FIG. 6 is a first partial schematic diagram of displaying a 3D picture of a 3D display device having a lens-switching function according to a first embodiment of the present invention.

Specifically, the LCD shieling pattern layer 330 is provided with a shielding region 331 and a light transparent region 332. With reference to FIG. 4 and FIG. 5, wherein, FIG. 4 is a schematic diagram of an optical path propagation of a 3D display device having a lens-switching function according to the present invention and FIG. 5 is another schematic diagram of an optical path propagation of a 3D display device having a lens-switching function according to the present invention.

The lens-array plate 320 includes multiple lens units 321. The lens-array plate 320 is formed by liquid crystal lens units or solid-state lens units. Each of the lens units 321 can be a lenticular lens or a compound-eye lens. The arrangement can be closely contacted or irregularly. A shape of each lens unit 321 can be a circle, a square, a rectangle or a polygonal. The shape and the arrangement way of the lens units 321 of the lens-array plate 320 are not limited here.

Wherein, an area of a single light transparent region 332 of the LCD shielding pattern layer 330 is smaller than an area of a single lens unit 321 of the lens-array plate 320. As shown in FIG. 4, the lights at an edge portion of the lens unit 321 cannot pass through such that the edge of the lens unit 321 corresponding to the shielding region 331 is shielded in order to eliminate the cross talk because of the scattering and bluntness at the edge. Wherein, "A" represents a location of human eyes and "a" represent a location of a sampling on the LCD picture layer 310.

The area of a single light transparent region 332 of the LCD shielding pattern layer 330 is smaller than the area of a single lens unit 321 of the lens-array plate 320, which is equal to reduce the area of the light transparent region 332. That is, reducing a light transparent aperture of the lens unit 321 corresponding to the shielding region 331. A shown in FIG. 5, because the light transparent aperture of the lens unit 321 is reduced, a sampling area on the display layer 310 for a "b" sampling point is obviously reduced. That is, a picture at a location B of the human eye is clearer. The present invention effectively reduces the cross talk generated by the aberration caused by different sampling areas at different viewing angles.

Preferably, the LCD shielding pattern layer 330 can be disposed between the lens-array plate 320 and the LCD picture layer 310. That is, the location of the LCD shielding pattern layer 330 and the lens-array plate 320 is reversed.

Figure 7:
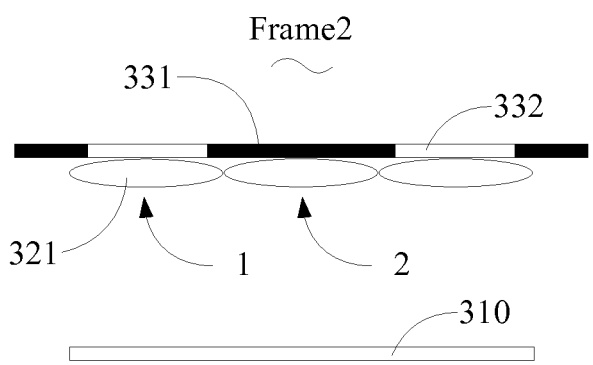
FIG. 7 is a second partial schematic diagram of displaying a 3D picture of a 3D display device having a lens-switching function according to a first embodiment of the present invention.

With reference from FIG. 4 to FIG. 7, FIG. 6 is a first partial schematic diagram of displaying a 3D picture of a 3D display device having a lens-switching function according to a first embodiment of the present invention; FIG. 7 is a second partial schematic diagram of displaying a 3D picture of a 3D display device having a lens-switching function according to a first embodiment of the present invention. When the synchronous picture providing system transmits a first frame (frame 1) of a 3D picture to the LCD picture layer 310, the LCD shielding pattern layer 330 shields an odd number lens unit 1. When the synchronous picture providing system transmits a second frame (frame 2) of a 3D picture to the LCD picture layer 310, the shielding layer 330 shields an even number lens unit 2. Alternately displaying the 3D pictures corresponding to the odd number and the even number lens units 321 in order to generate a 3D effect. Wherein, in the present embodiment, a refresh rate of each of the display layer 310 and the LCD shielding pattern layer 330 is at least 120 Hz such that the human eye will not recognize a flicker phenomenon.

Figure 8:
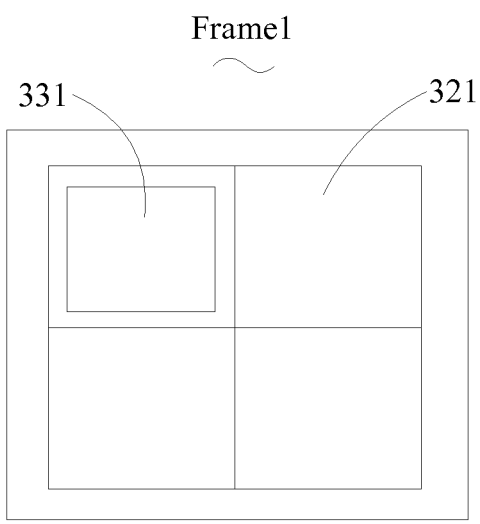
FIG. 8 is a first partial schematic diagram of displaying a 3D picture of a 3D display device having a lens-switching function according to a second embodiment of the present invention.
Figure 9:
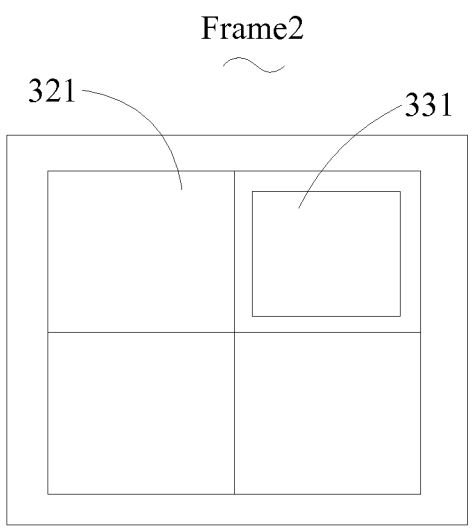
FIG. 9 is a second partial schematic diagram of displaying a 3D picture of a 3D display device having a lens-switching function according to a second embodiment of the present invention.
Figure 10:
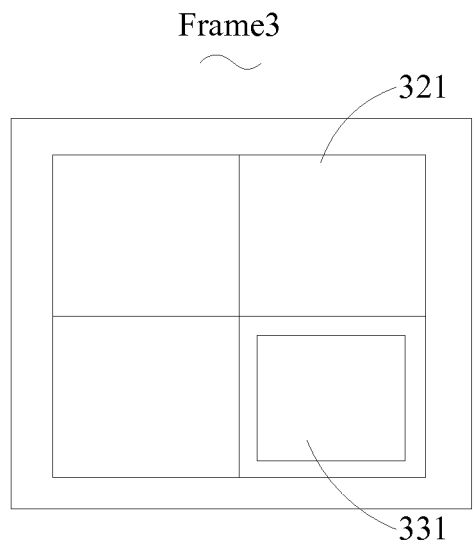
FIG. 10 is a third partial schematic diagram of displaying a 3D picture of a 3D display device having a lens-switching function according to a second embodiment of the present invention.
Figure 11:
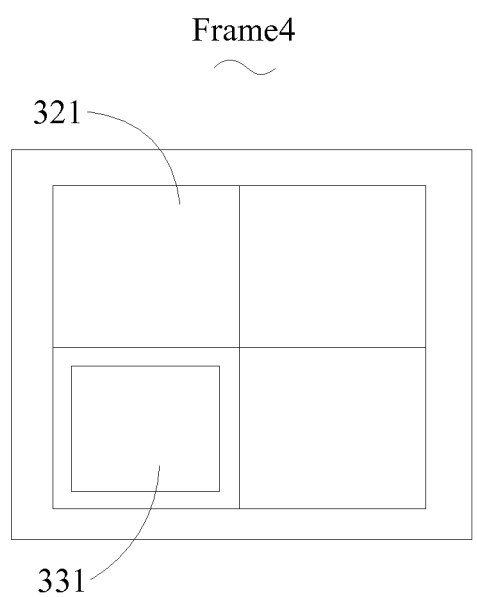
FIG. 11 is a fourth partial schematic diagram of displaying a 3D picture of 3D display device having a lens-switching function according to a second embodiment of the present invention.

With reference from FIG. 8 to FIG. 11, wherein, FIG. 8 is a first partial schematic diagram of displaying a 3D picture of a 3D display device having a lens-switching function according to a second embodiment of the present invention; FIG. 9 is a second partial schematic diagram of displaying a 3D picture of a 3D display device having a lens-switching function according to a second embodiment of the present invention; FIG. 10 is a third partial schematic diagram of displaying a 3D picture of a 3D display device having a lens-switching function according to a second embodiment of the present invention; and FIG. 11 is a fourth partial schematic diagram of displaying a 3D picture of a 3D display device having a lens-switching function according to a second embodiment of the present invention. In this embodiment, the lens-array plate 320 utilizes a matrix structure, and use four lens units 321 as a display unit.

When synchronous the picture providing system transmits a first frame (frame 1) of a 3D picture to the LCD picture layer (not shown in the figure), the LCD shielding pattern layer (represented by a shielding region 331 in the figure) shields an odd row and odd column lens unit 321. When the synchronous picture providing system transmits a second frame (frame 2) of a 3D picture to the LCD picture layer, the LCD shielding pattern layer shields an odd row and even column lens unit 321. When the synchronous picture providing system transmits a third frame (frame 3) of a 3D picture to the LCD picture layer, the LCD shielding pattern layer shields an even row and even column lens unit 321. When the synchronous picture providing system transmits a fourth frame (frame 4) of a 3D picture to the LCD picture layer, the LCD shielding pattern layer shields an even row and odd column lens unit 321. Alternately shielding different lens units 321 in order to display the 3D pictures in one display unit in order to achieve a 3D effect. Similarly, in other display units, the operation method is the same in order to realize a 3D display effect of whole display picture layer. Wherein, in the present embodiment, a refresh rate of each of the LCD picture layer and the LCD shielding pattern layer is at least 240 Hz such that the human eyes will not recognize a flicker phenomenon.

Of course, the display units are not limited to above formats. By increasing a refresh rate of the LCD picture layer and the LCD shielding pattern layer, the arrangement of the lens units 321 and the number of the lens units 321 in the display units may be changed.

The 3D display device having a lens-switching function of the present invention, Through increasing an area of black shielding pattern, an edge of each lens unit corresponding to the shielding region is shielded, the area of a single light transparent region is reduced, and a light transparent aperture of a lens unit corresponding to the shielding region is reduced in order to eliminate a cross talk generated by scattering and bluntness at the edge. A cross talk caused by an aberration generated by different sizes of sampling points at different viewing angles is also reduced.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A three-dimensional (3D) display device having a lens-switching function, comprising:
    a liquid-crystal-display (LCD) picture layer;
    a lens-array plate;
    an LCD shielding pattern layer, wherein the LCD shielding pattern layer, the lens-array plate, and the LCD display picture layer are stacked in order; and
    a synchronous picture providing system connected with the LCD picture layer and the LCD shielding pattern layer such that the LCD display picture layer and the LCD shielding pattern layer are synchronous to respectively display a 3D picture and a shielded pattern;
    wherein, the LCD shielding pattern layer includes a shielding region and a light transparent region disposed with an interval; the lens-array plate has multiple lens units; an area of a single light transparent region is smaller than an area of a single lens unit such that an edge of each lens unit corresponding to the shielding region is shielded, the area of a single light transparent region is reduced, and a light transparent aperture of a lens unit corresponding to the shielding region is reduced in order to eliminate a cross talk generated by scattering and bluntness at the edge; and
    wherein, when the synchronous picture providing system transmits a first frame of a 3D picture to the LCD picture layer, the LCD shielding pattern layer shields an odd number lens unit; when the synchronous picture providing system transmits a second frame of a 3D picture to the LCD picture layer, the LCD shielding pattern layer shields an even number lens unit so as to alternatively display the 3D pictures corresponding to the odd number and the even number lens units.

2. The 3D display device having a lens-switching function according to claim 1, wherein, the LCD shielding pattern layer is disposed between the lens-array plate and the LCD picture layer.

3. The 3D display device having a lens-switching function according to claim 1, wherein, the lens-array plate is formed by multiple liquid-crystal lens units or multiple solid-state lens units.

4. The 3D display device having a lens-switching function according to claim 1, wherein, each lens unit is a cylindrical lens or a compound eye lens, and the lens units are closely contacted.

5. The 3D display device having a lens-switching function according to claim 4, wherein, a shape of each lens unit is a circle, a square, a rectangle or a polygon.

6. The 3D display device having a lens-switching function according to claim 1, wherein, a refresh rate of each of the LCD picture layer and the LCD shielding pattern layer is at least 120 Hz.

7. A 3D display device having a lens-switching function, comprising:
    a liquid-crystal-display (LCD) picture layer;
    a lens-array plate;
    an LCD shielding pattern layer, wherein the LCD shielding pattern layer, the lens-array plate, and the LCD display picture layer are stacked in order; and
    a synchronous picture providing system connected with the LCD picture layer and the LCD shielding pattern layer such that the LCD display picture layer and the LCD shielding pattern layer are synchronous to respectively display a 3D picture and a shielded pattern;
    wherein, the LCD shielding pattern layer includes a shielding region and a light transparent region disposed with an interval; the lens-array plate has multiple lens units; an area of a single light transparent region is smaller than an area of a single lens unit such that an edge of each lens unit corresponding to the shielding region is shielded, the area of a single light transparent region is reduced, and a light transparent aperture of a lens unit corresponding to the shielding region is reduced in order to eliminate a cross talk generated by scattering and bluntness at the edge; and
    wherein, when the synchronous picture providing system transmits a first frame of a 3D picture to the LCD picture layer, the LCD shielding pattern layer shields an odd row and odd column lens unit; when the synchronous picture providing system transmits a second frame of a 3D picture to the LCD picture layer, the LCD shielding pattern layer shields an odd row and even column lens unit; when the synchronous picture providing system transmits a third frame of a 3D picture to the LCD picture layer, the LCD shielding pattern layer shields an even row and even column lens unit; when the synchronous picture providing system transmits a fourth frame of a 3D picture to the LCD picture layer, the LCD shielding pattern layer shields an even row and odd column lens unit so as to alternatively display the 3D pictures.

8. The 3D display device having a lens-switching function according to claim 7, wherein, a refresh rate of each of the LCD picture layer and the LCD shielding pattern layer is at least 240 Hz.

9. A 3D display device having a lens-switching function, comprising:
- a liquid-crystal-display (LCD) picture layer;
- a lens-array plate;
- an LCD shielding pattern layer, wherein the LCD shielding pattern layer, the lens-array plate, and the LCD display picture layer are stacked in order; and
- a synchronous picture providing system connected with the LCD picture layer and the LCD shielding pattern layer such that the LCD display picture layer and the LCD shielding pattern layer are synchronous to respectively display a 3D picture and a shielded pattern;

wherein, the LCD shielding pattern layer includes a shielding region and a light transparent region disposed with an interval; the lens-array plate has multiple lens units; an area of a single light transparent region is smaller than an area of a single lens unit such that an edge of each lens unit corresponding to the shielding region is shielded, the area of a single light transparent region is reduced, and a light transparent aperture of a lens unit corresponding to the shielding region is reduced in order to eliminate a cross talk generated by scattering and bluntness at the edge;

wherein, each lens unit is a cylindrical lens or a compound eye lens, and the lens units are closely contacted; and wherein, when the synchronous picture providing system transmits a first frame of a 3D picture to the LCD picture layer, the LCD shielding pattern layer shields an odd row and odd column lens unit; when the synchronous picture providing system transmits a second frame of a 3D picture to the LCD picture layer, the LCD shielding pattern layer shields an odd row and even column lens unit; when the synchronous picture providing system transmits a third frame of a 3D picture to the LCD picture layer, the LCD shielding pattern layer shields an even row and even column lens unit; when the synchronous picture providing system transmits a fourth frame of a 3D picture to the LCD picture layer, the LCD shielding pattern layer shields an even row and odd column lens unit so as to alternatively display the 3D pictures.

10. The 3D display device having a lens-switching function according to claim 9, wherein, a refresh rate of each of the LCD picture layer and the LCD shielding pattern layer is at least 240 Hz.

* * * * *